Figure 1:
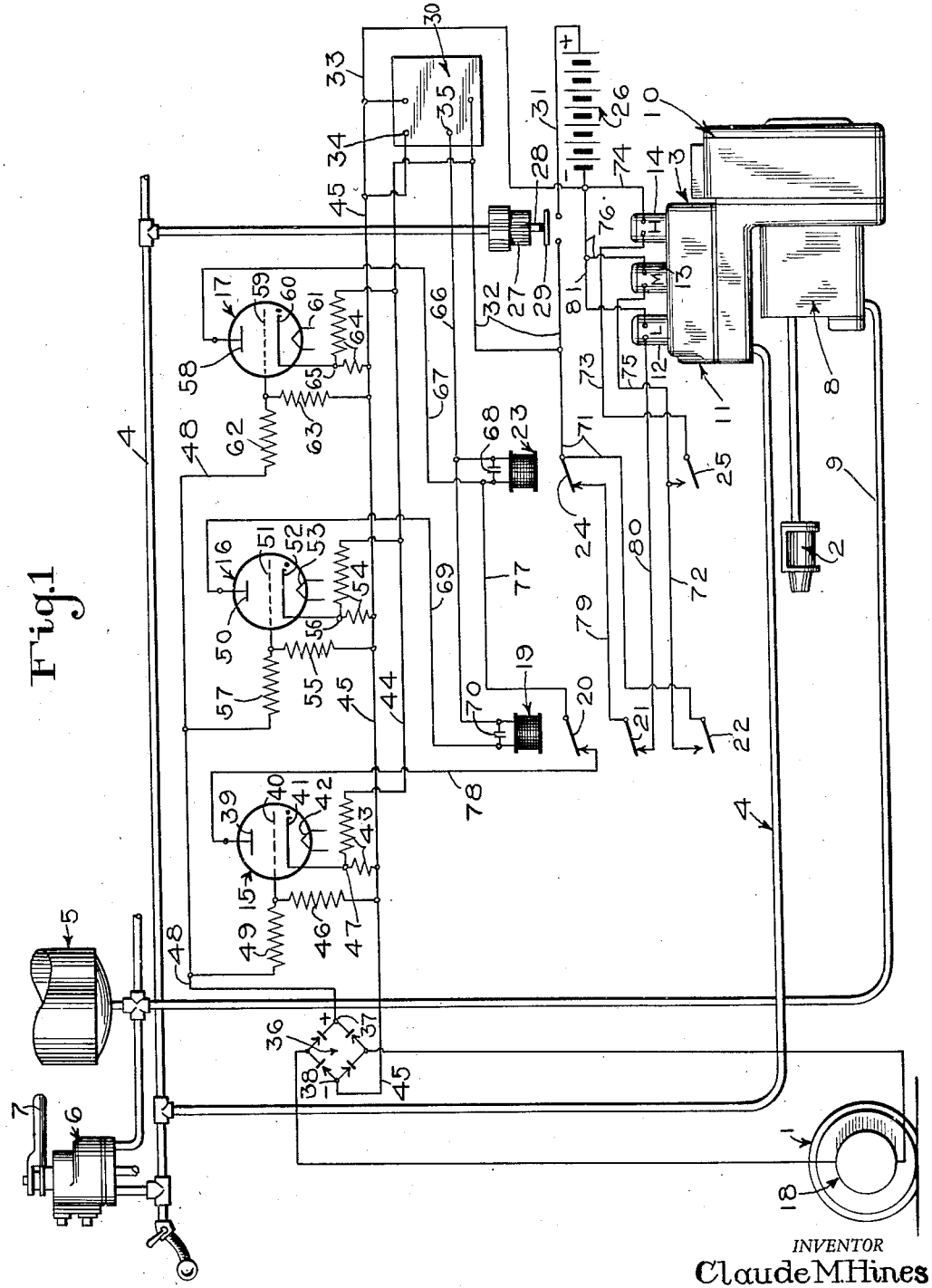

Nov. 13, 1945.   C. M. HINES   2,389,051
ELECTRONIC BRAKE CONTROL APPARATUS
Filed June 14, 1944   3 Sheets-Sheet 3

Fig. 3

INVENTOR
Claude M Hines
BY
ATTORNEY

Patented Nov. 13, 1945

2,389,051

UNITED STATES PATENT OFFICE 2,389,051

ELECTRONIC BRAKE CONTROL APPARATUS

Claude M. Hines, Pittsburgh, Pa., assignor to The Westinghouse Air Brake Company, Wilmerding, Pa., a corporation of Pennsylvania Application June 14, 1944, Serial No. 540,278

17 Claims. (Cl. 303—21)

This invention relates to electropneumatic brake equipments for high speed trains, and more particularly to a brake equipment having automatic speed governor control for regulating the degree of an application of the brakes in proportion to speed.

The operation of railroad trains in modern high speed service has involved problems necessitating the invention of improved and more efficient air brakes. In order to minimize the time and distance required for stopping a train, and thus to promote safety and economic advantages rendering possible the maintenance of crowded schedules, trains have been equipped with brake apparatus providing a higher braking ratio, i. e., brakes that exert greater force with relation to the weight of the cars, than that formerly considered adequate. It has been demonstrated, however, that while the desired short stops can be obtained by use of brakes operative with increased braking ratio at high speeds, it is expedient to provide means for determining the braking ratio substantially in proportion to train speed, to avoid objectionably sudden stops and risk of sliding of the wheels upon the increase in brake shoe friction encountered at lower speeds. Sliding of the wheels of a vehicle in a train tends to extend the stopping distance, causes expensive damage to equipment, and is in general regarded as an intolerable condition in railroad service.

One widely approved method of minimizing the stopping distance resulting from an application of the brakes on a high speed train is to regulate the brakes automatically in a manner such that available braking power is always proportioned to the speed of the train. A well known brake controlling valve device that has been successfully employed as an element of air brake equipments now in service, for automatically controlling brake cylinder pressure with relation to speed, is the electroresponsive multiple-diaphragm relay valve disclosed in the United States Patent 2,140,624, issued December 20, 1938, to E. E. Hewitt. This relay valve device comprises a self-lapping valve mechanism controlled by a diaphragm stack consisting of separate diaphragms of different areas, which are individually and selectively subjected to the pressure of air in a control pipe, in accordance with energization and deenergization of three magnet valves that are in turn controlled by a speed governor. In operation, the self-lapping valve mechanism of this form of relay valve device functions to develop brake cylinder pressure on one of the diaphragms in opposition to control pipe pressure acting on another unit of the diaphragm stack, the difference in areas of the diaphragms, selected with relation to train speed through the operation of the speed governor and magnet valves, thus measuring available brake cylinder pressure substantially in proportion to the speed of the train.

It has been proposed to control the energization of the magnet valves of a multiple diaphragm relay valve device of the type just described by means of a mechanically driven inertia responsive speed governor controlling suitable switch contact elements, or alternatively by means of an axle driven generator operative to produce a voltage proportional to speed for controlling banks of sensitive relays associated with the magnet valves. Although satisfactory operation in service has been demonstrated with trains carrying brake equipments having these speed control features the expense of installation and maintenance of the governor and the associated banks of relays may constitute a deterrent to the adoption of such apparatus for general railway service. It is consequently desirable to develop less expensive and more readily serviceable speed governor apparatus for controlling the magnet valve elements of the relay valve device.

One object of my invention is to provide an improved electropneumatic brake equipment having electronic means for effecting accurate and sensitive control of the degree of application of the brakes in accordance with the speed of the vehicle.

Another object of my invention is to provide an improved electropneumatic brake equipment embodying speed control features of the class described, and including improved electronic speed governor means of relatively inexpensive construction and involving low maintenance expense.

It is a further object of the invention to provide an improved electropneumatic brake equipment for a vehicle comprising brake controlling means adapted to regulate the force of each application of the brakes with relation to the speed of the vehicle, electrical speed governor means driven by a wheel unit of the vehicle, and a plurality of electron discharge devices arranged to be selectively controlled in accordance with operation of the speed governor means, to condition the brake controlling means for proper operation corresponding to any of a number of predetermined ranges of speed attained by the vehicle.

Still another object of the invention is to provide an improved speed controlled electropneumatic brake equipment embodying a plurality of electron discharge devices selectively operative to effect control of the available braking force in proportion to the speed of the vehicle, and means controlling the conductivity of the electron discharge devices in accordance with the varying output of a small, inexpensive axle-driven alternating current generator, which is designed to serve the purpose of the relatively complicated and expensive speed governor required in earlier equipments. A generator suitable for this purpose may be simply and inexpensively constructed without use of the often troublesome commutator and brushes for operation to deliver alternating current amounting to only a few microamperes.

Figure 2:
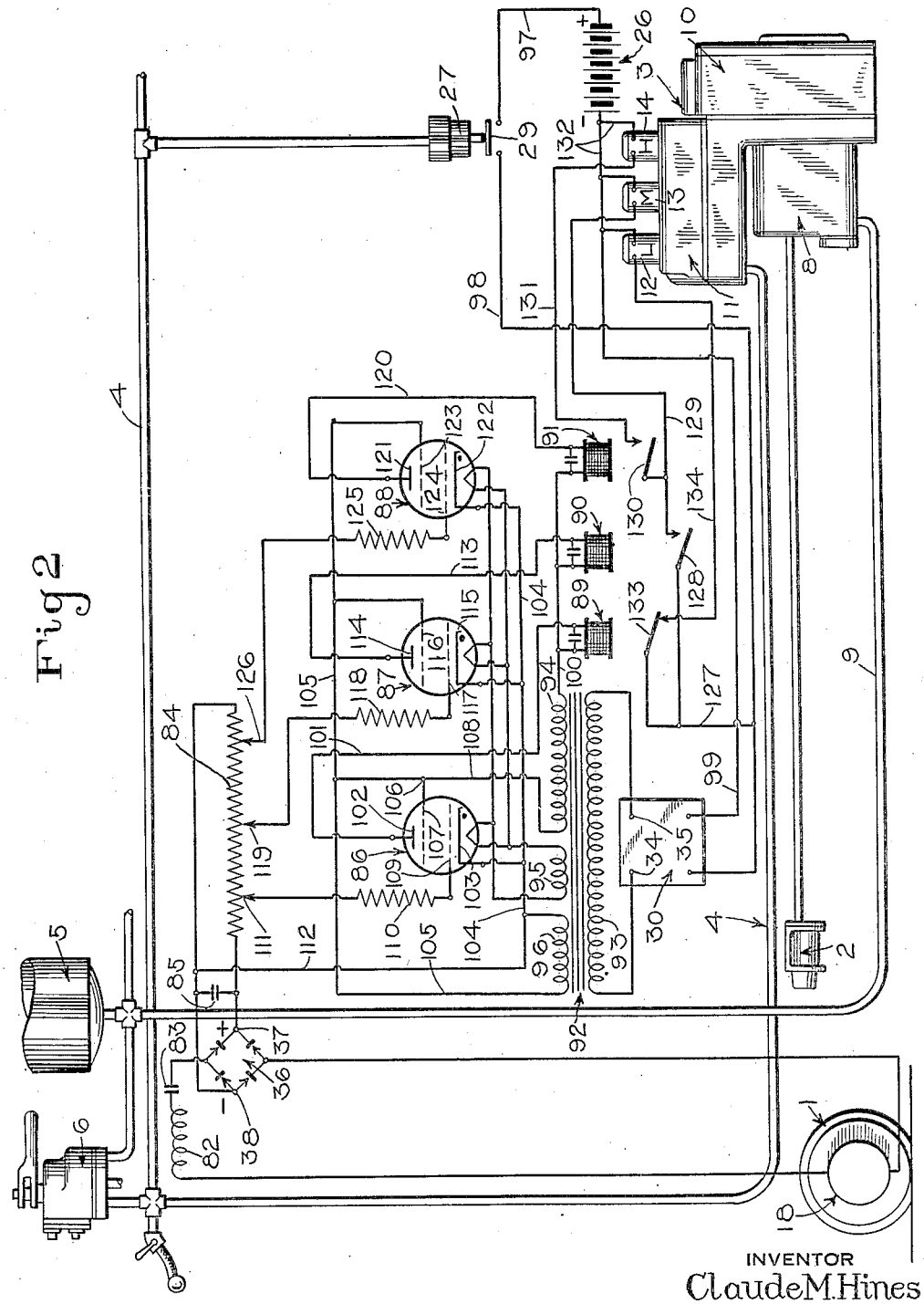

Other objects and advantages of the invention will appear in the following more detailed description of three embodiments thereof, taken in connection with the accompanying drawings, in which Fig. 1 is a schematic view of an elementary form of speed controlled electropneumatic brake equipment constructed in accordance with one form of the invention;

Fig. 2 is a schematic view of the electropneumatic brake equipment constructed in accordance with a different form of the invention; and Fig. 3 is a similar view of still another form of electropneumatic brake equipment having speed control features contributed by the invention.

*Apparatus shown in Fig. 1*

In Fig. 1 there is illustrated an elementary type of fluid pressure brake equipment arranged for association with one preferred species of electronic speed control apparatus embodying the invention. The brake equipment is adapted to be carried on a locomotive having a wheel unit 1, and comprises a brake cylinder 2 operative to apply braking force to wheels of the locomotive, a speed responsive relay valve device 3, a control pipe 4, a source of fluid under pressure including a main reservoir 5, and a manually operative self-lapping brake valve device 6 interposed between the reservoir and the control pipe.

The self-lapping brake valve device 6 may be of any suitable construction, and is adapted for operation to control supply of fluid under pressure from the reservoir 5 to the control pipe 4 in accordance with the positioning of a handle 7, the mechanism within the valve device being constructed and arranged to maintain any desired pressure in the control pipe within a predetermined range.

The speed responsive relay valve device 3 is shown only in outline form in Fig. 1, as the operating details of this device are well understood by those familiar with the art. A complete and detailed description of this relay valve device is presented in the aforementioned Patent 2,140,624 to E. E. Hewitt. By way of brief review of the construction of the speed responsive relay valve device 3, the main portions thereof comprise a self-lapping supply and release valve section 8 for controlling communication to the brake cylinder 2 from a supply pipe 9 leading from the main reservoir 5, a diaphragm section 10, and a magnet valve section 11 equipped with low speed, medium speed and high speed magnet windings 12, 13 and 14, respectively. The self-lapping relay valve mechanism contained in the portion 8 is adapted to be actuated in accordance with a resultant force exerted through the medium of four co-axially spaced unconnected diaphragms (not shown) mounted within the diaphragm portion 10, which diaphragms are selectively subjected to the pressure of fluid delivered through the control pipe 4 and by way of valves (not shown) controlled by the magnet windings 12, 13 and 14. By reason of the fact that the four diaphragms have different pressure areas, the operation of the magnet valves according to vehicle speed to select various combinations of the diaphragms for exerting the resultant operating force on the self-lapping supply valve within the portion 8 causes the pressure of fluid supplied to the brake cylinder 2 to bear a relation to the pressure in the control pipe that is properly proportioned to the speed of the vehicle.

It will be understood, as fully explained in the patent, supra, that at train speeds in excess of sixty-five miles per hour the high and medium speed magnet windings 14 and 13 are energized to condition the relay valve device 3 to supply fluid to the brake cylinder 2 at a pressure equal to that in the control pipe 4. When the locomotive is operated at between sixty-five and forty miles per hour, only the medium speed magnet winding 13 is energized and the relay valve device 3 is then conditioned to supply fluid to the brake cylinder at a pressure approximating 80% of the control pipe pressure. All three of the magnet windings are deenergized while the locomotive is operated at speeds between forty and twenty miles per hour, and the relay valve device is then rendered operative to maintain a 60% ratio between the pressure of fluid in the brake cylinder and control pipe pressure. When the speed of the locomotive is below twenty miles per hour, only the low speed magnet winding 12 is adapted to be energized and in such case the relay valve device 3 functions to maintain brake cylinder pressure at approximately 40% of the pressure of fluid in the control pipe 4.

According to the invention, electronic apparatus is provided for controlling energization of the magnet windings of the relay valve device 3 in accordance with the speed of the locomotive. As shown in Fig. 1, this apparatus may include three electron discharge devices or tubes indicated generally by the reference characters 15, 16 and 17, which are preferably of the type having an envelope filled with an ionizing medium, such as gas. As hereinafter explained, the electron discharge devices are adapted to be connected and suitably biased to be rendered responsive to the output of a speed governor or generator 18 operated by the wheel unit 1, for automatically controlling circuits for the magnets of the relay valve device 3 in predetermined sequence, according to the speed of the vehicle.

The apparatus associated with the electronic devices further comprises a relay 19 having three movable contact elements 20, 21 and 22, a similar relay 23 having contact elements 24 and 25, a source of electrical energy such as the vehicle battery 26, a pneumatic switch 27 having a piston rod 28 carrying an insulated contact element 29, and an inverter device 30, which may be of any suitable type operative to convert the battery voltage to a suitable alternating current voltage for controlling the electron discharge devices. The battery 26 is arranged to energize the inverter 30 through the medium of a circuit controlled by the pneumatic switch 27. This circuit includes the positive terminal of the battery 26, a conductor 31, the switch contact element 29, which is held open when the pneumatic switch is not subjected to fluid pressure, a conductor 32, the inverter device 30, and a conductor 33 leading to the negative terminal of the battery. The inverter device is constructed and arranged to deliver alternating current to a pair of output terminals 34 and 35.

The speed governor device 18 may comprise a small alternating current generator, the output of which is rectified by means of a full wave rectifier assemblage 36 having a positive output terminal 37 and a negative terminal 38. As hereinafter more fully explained, the output of the axle driven generator 18 is utilized only for controlling the grid bias of the several electron discharge devices already referred to, and may be of simple and inexpensive construction, the voltage and power requirements being such that a speedometer type of equipment can be employed. This form of generator may have a stationary winding in which an alternating current voltage is generated by means of a revolving permanent magnet, so that no commutator or brushes are required. It may be preferred to construct this generator with permanent magnets as part of the stator, and to provide a rotor consisting of a stock of laminations of suitable form.

The three tubes 15, 16 and 17 are adapted to be biased by means of resistors and so connected in the circuit that they will become conducting at the required speeds for effecting properly coordinated control of the electric relays 19 and 23, the contacts of which in turn control the low, medium and high speed magnet windings of the relay valve device 3. The electron discharge device or tube 15 is of the triode type comprising an anode 39, a control element or grid 40, a cathode 41, and a heating filament 42. Associated with the tube 15 is a resistor 43, one end of which is connected to the positive terminal of battery 26 through a conductor 44, conductor 32, contact element 29 and conductor 31, the other end of the resistor being connected to the negative terminal by means of a conductor 45 and conductor 33. The grid 40 is also connected to the negative side of the battery through a resistor 46 and conductor 45, while the cathode 41 is connected to a tap 47 on the resistor 43. It will be understood that since a current flows through the resistor 43 during an application of the brakes as hereinafter explained, the cathode will be positive with respect to the grid due to the drop in voltage in that portion of the resistor 43 between the cathode and the negative side of the battery. Consequently, the grid is normally negative with respect to the cathode, and the tube will not conduct.

The grid 40 of tube 15 is also connected to the full wave rectifier 36 associated with the speed governer or generator 18 so as to cause the voltage output thereof to oppose the normally negative grid bias on the grid. As shown in Fig. 1, the grid control circuit for the tube 15 includes the positive terminal 37 of the rectifier 36, a conductor 48, a resistor 49, the terminal of the grid 40, the resistor 46, and the conductor 45 leading to the negative terminal 38 of the rectifier.

The electron discharge device or tube 16 comprises an anode 50, a grid 51, a cathode 52, and a filament 53. A resistor 54 is associated therewith and has one end connected to the negative terminal of the battery 26 by way of conductor 45 and the other connected to the positive terminal by way of conductor 44. The grid 51 has a biasing circuit including a resistor 55, conductor 45, a portion of the resistor 54, a tap connection intermediate the ends thereof indicated by the reference character 56, and the cathode 52. The grid 51 is also connected through a resistor 57 to the conductor 48. The tube 17 is constructed and arranged in substantially the same manner and comprises an anode 58, a grid 59, a cathode 60 and a filament 61, the grid 59 being connected through a resistor 62 to the conductor 48, and also to a grid biasing circuit including a resistor 63, conductor 45, a resistor 64, and a tap connection 65 to the cathode 60. The resistor 64 is of course interposed between the negative conductor 45 and the conductor 44 leading to the positive terminal of the battery 26.

It should be understood that the elements of the individual grid circuits for the tubes 15, 16 and 17 are so proportioned as to cause a predetermined minimum negative voltage to be impressed on the grid 40, a negative voltage of predetermined higher potential to be impressed on the grid 51 of tube 16, and a maximum negative biasing potential of still greater magnitude to be impressed on the grid 59 of the last tube 17. In other words, the grids of the three tubes 15, 16 and 17 are progressively biased more negatively so that progressively higher positive voltages delivered from the axle driven generator will be required to overcome the respective biasing potentials. In practice the tube 17 is thus adapted to be rendered conductive at all speeds in excess of sixty-five miles per hour and to become nonconductive when the vehicle travels at lower speeds. In like fashion the tubes 16 and 15 are so biased as to become successively nonconductive in response to reductions in the grid controlling voltages corresponding to reduction in vehicle speeds below forty miles per hour and twenty miles per hour, respectively.

Let it be assumed that an application of the brakes is initiated while the vehicle is traveling at a speed in excess of sixty-five miles per hour, and that the brakes are to be maintained in applied condition until the speed is reduced below twenty miles per hour. Upon operation of the handle of brake valve device 6 to the position corresponding with the power with which the brakes are to be applied, fluid under pressure is supplied thereby to the control pipe 4 in the usual manner. When the pressure of fluid in the control pipe has been increased to about five pounds per square inch, the pneumatic switch 27 is operated to close the contact element 29, thus energizing the various controlling circuits hereinafter traced. Since the vehicle is traveling at a speed in excess of sixty-five miles per hour, the output of the generator 18 is sufficient to impress a positive voltage of sufficiently high value on each of the control members or grids of the electron discharge devices 15, 16, and 17.

The coil of the relay 23 is now energized through a circuit which includes the terminal 35 of the inverter 30, a conductor 66, the winding of the relay, a conductor 67, anode 58 and cathode 60 of tube 17, a portion of resistor 64, conductor 45, and the other output terminal 34 of the inverter device. The relay 23 is preferably made slow acting by means of a condenser 68 which is connected across the coil in order to prevent the relay from following the pulsating direct-current flowing through the electron discharge device 17. At the same time, the relay 19 is energized by way of a circuit which includes the terminal 35 of the inverter device, conductor 66, the winding of the relay, a conductor 69, anode 50 and cathode 52 of tube 16, resistance 54, conductor 45, and the terminal 34 of the inverter device. A condenser 70 is connected in parallel with the winding of the relay 19 to smooth out the pulsating current and thereby to stabilize operation of that device. Upon energization of relay 19, the contact element 20 is picked up, interrupting the plate supply for tube 15.

Upon energization of the relays 23 and 19, as just explained, the high and medium speed magnets 14 and 13 of the relay valve device 3 are energized while the low speed magnet 12 remains in deenergized condition. The circuit for the high speed magnet 14 includes the positive terminal of the battery 26, conductor 31, switch contact element 29, conductor 32, a conductor 71, the closed contact element 22 of the relay device 19, a conductor 72, the closed contact element 25 of the relay 23, a conductor 73, the winding of the magnet 14, and a conductor 74 leading to the negative terminal of the battery. The circuit for energizing the medium speed magnet 13 can be traced through the same conductors to and including the conductor 72, and from there to the negative terminal of the battery by way of a conductor 75, the winding of the magnet 13, and a conductor 76. With both the medium and high speed magnets of the relay valve device 3 thus energized, the supply valve portion thereof is automatically conditioned to supply fluid under pressure to the brake cylinder 2 at substantially the same pressure created in the control pipe 4 by operation of the engineer's brake valve device, in the manner hereinbefore explained.

When the speed of the vehicle is reduced below sixty-five miles per hour, the output of the generator 18 driven by the wheel 1 decreases to a voltage below the cutoff point of the tube 17, with the result that the negative biasing voltage impressed on the grid 59 thereof causes the grid to regain control at the end of the half cycle at which cutoff occurs, whereupon the tube ceases to conduct. With the tube 17 thus rendered nonconductive, the relay 23 is deenergized, thus opening the contact element 25 for cutting off supply of current to the high speed magnet 14. The relay valve device 3 then operates in response to deenergization of the magnet 14, while the medium speed magnet 13 remains energized, to effect the reduction in the pressure of fluid supplied to the brake cylinder 2 at a controlled rate down to a value approximating 80% of the pressure of fluid in the control pipe 4, thus maintaining a braking force commensurate with the speed of the vehicle.

When the speed of the locomotive is further reduced to below forty miles per hour, the voltage output of the axle driven generator 18 is accordingly decreased to the cutoff point of the electron discharge device or tube 16, as predetermined by adjustment of the biasing voltage on the grid element 51 hereinbefore explained. This tube then ceases to conduct current to the relay 19, the contact element 22 of which is thereby dropped out to deenergize the medium speed magnet 13 of the relay valve device 3. At the same time, contact elements 20 and 21 controlled by relay 19 are closed, the contact element 20 completing the plate circuit for the tube 15 for energizing the other relay 23. This circuit includes the terminal 35 of the inverter device 30, conductor 66, the winding of the relay 23, a conductor 77, contact element 20, a conductor 78, the anode 39 and cathode 41 of tube 15, resistance 43, and conductor 45 leading to the other output terminal 34 of the inverter device. With the relay 23 thus energized, the contact element 24 thereof is picked up or opened to prevent energization of the low speed magnet 12 of the relay valve device 3. Thus at this time all three magnet valve mechanisms of the relay valve device 3 are deenergized to effect operation of the associated supply valve mechanism 8 to reduce the degree of application of the brakes at a controlled rate to that established when brake cylinder pressure approximates 60% of control pipe pressure.

When the speed of the vehicle has been reduced below twenty miles per hour, the tube 15 is rendered nonconductive due to the fact that the positive output voltage impressed on the control element or grid 40 thereof is brought below that of the negative biasing voltage normally impressed thereon in the manner hereinbefore explained. When the tube 15 is thus rendered nonconductive, the relay 23 is deenergized and the contact element 24 thereof is thereby closed to effect energization of the low speed magnet 12 of the relay valve device 3 through a circuit which includes the positive terminal of the battery 26, conductor 31, switch contact element 29, conductors 32 and 71, relay contact element 24, a conductor 79, the closed contact element 21 of deenergized relay 19, a conductor 80, the winding of the low speed magnet 12, a conductor 81 and conductor 76 leading to the negative terminal of the battery. With the low speed magnet 12 thus energized, the relay valve device 3 is rendered operative to effect a reduction in the pressure of fluid in the brake cylinder to a value approximating 40% of that established in the control pipe 4, and this ratio of brake cylinder pressure to control pipe pressure is then continued without further change until the vehicle is brought to a stop.

*Apparatus shown in Fig. 2*

In Fig. 2 of the drawings there is disclosed an electronic brake control apparatus embodying the invention in a different form, in which three electron discharge devices or tubes are normally subjected to the same negative biasing voltages, which under operating conditions is opposed in the case of each discharge device by a different preselected positive controlling voltage created in a series-resonant circuit by a wheel-driven alternating current generator. The individual grid circuits of the tubes are in addition arranged to provide a preselected conductive condition for each tube which is inherently checked against failure of the associated bias voltage circuit that would render the tube conductive at a time when no control voltage is applied. In Fig. 2, the elements of the brake control apparatus that are counterparts of those shown in Fig. 1 have been indicated by the same reference characters.

According to the invention as disclosed in Fig. 2, the speed governor circuit energized by the wheel-driven alternating current generator 18 constitutes a series resonant circuit and includes an inductance 82, a condenser 83 and the full wave rectifier 36 connected in series with the terminals of the generator 18, and a voltage divider or resistor 84 connected across the output terminals 37 and 38 of the rectifier. It will be understood that for a given value of impressed voltage the current in a series-resonant circuit depends upon the resistance, inductance, and capacitance. For given values of inductance and capacitance there is one frequency, called the resonant frequency, at which the current is a maximum for any given voltage. In the present instance I propose to select the inductance 82 and capacitance 83 in such relationship to other elements in the circuit as to fix the resonant frequency at a value well above that attained by the alternating current generator when driven at the maximum speed of the locomotive. Accordingly, the current supplied through the resistor 84 during operation of the generator 18 will increase substantially in proportion to an increase in the speed, not only because of the resultant change in voltage output by the generator, but also by reason of the change in frequency, as the frequency approaches the point of resonance. It will be noted that an additional condenser 85 is preferably connected across the output terminals of the rectifier 36 to act as a filter for smoothing out the pulsating current supplied through the voltage divider or resistor 84.

The voltage drop across preselected sections of the resistor 84 is utilized in measuring control grid bias for three electron discharge devices or tubes 86, 87 and 88, the anode-cathode circuits of which are connected respectively to the coils of repeater relays 89, 90 and 91. As hereinafter explained, the relays are adapted to control energization of the low, medium and high speed magnets 12, 13 and 14 of the brake controlling relay valve device 3 for governing the degree of application of the brakes. The electronic brake control system also includes a transformer 92, which is arranged to energize the plate circuits of the tubes, and also to supply the biasing voltages impressed on the individual shield grids thereof. The transformer 92 has a primary winding 93 connected to the output terminals 34 and 35 of the inverter device 30, and three secondary windings, namely, a secondary winding 94 for energizing the plate circuits, a secondary winding 95 adapted to energize the filaments for heating the tubes, and a secondary winding 96 for supplying the biasing voltage of each of the tubes. As hereinbefore explained, the inverter device 30 functions to supply alternating current at the terminals 34 and 35 when energized from the battery 26, to which it is connected through a circuit including a conductor 96 connected to the positive terminal of the battery, the contact element 29 of the pneumatic switch device 27, a conductor 98, and a return conductor 99 leading to the negative terminal of the battery.

Each of the tubes 86, 87 and 88 comprises an anode, a shield grid, a control grid, a cathode, and the usual cathode heating filament. As already pointed out, all three tubes are negatively biased to the same voltage, while the voltage divider 84, which is energized from the axle driven generator and associated resonant circuit, is tapped at three points for supplying a different positive bias for the controlling grid of each of the tubes.

A combined anode and shield grid circuit for the tube 86 can be traced from the right-hand terminal of the secondary winding 94 of transformer 92 through a conductor 100, the winding of the relay 89, a conductor 101, an anode 102 of the tube 86, a cathode 103, conductor 104, the right-hand terminal of the secondary winding 96, a conductor 105 connected to the left-hand terminal of the winding, a terminal 106 of a shield grid 107 of the tube, and a conductor 108 leading to the left-hand terminal of secondary winding 94. The tube 86 also has a control grid 109, upon which a positive controlling voltage can be impressed upon suitable energization of a circuit which includes the terminal of the control grid, a current limiting resistor 110, a tap connection 111 and the portion of resistor 84 determined thereby, a conductor 112, and the cathode 103 of the tube.

It will be understood that the secondary winding 94 and secondary winding 96 of the transformer 92 are properly proportioned to provide a sufficient resultant voltage for the plate circuit of the tube 86, that is, a resultant voltage applied between anode 102 and cathode 103 tending to "fire" the tube, on each positive half cycle of alternating current delivered through the transformer. It will be observed that the polarity of connections between the secondary winding 96 of the transformer and the shield grid 107 is such that the shield grid will be rendered negative during each positive half cycle of current causing the plate or anode 102 to become positive. The elements of the shield grid circuit are so proportioned that such a negative bias voltage impressed on the shield grid renders the tube non-conductive, so long as no positive voltage of the required magnitude is impressed on the control grid 109. During each negative half cycle of alternating current, although the control grid 107 then becomes positive, the anode 102 is at the same time rendered negative, and the tube is still prevented from firing. It will be apparent that by the series connection of the secondary winding 96 supplying the bias voltage and the secondary winding 94 supplying the plate current, the various elements of the plate circuit and of the shield grid circuit of the tube 86 are so related that the tube cannot be inadvertently rendered conductive due to failure of a connection in the shield grid circuit, since such failure would also interrupt the plate circuit.

The tubes 87 and 88 are similarly connected for controlling energization of the respective relays 90 and 91. The plate circuit for the tube 87 includes the right-hand terminal of the secondary winding 94, conductor 100, the winding of the relay 90, a conductor 113, an anode or plate 114 of the tube, a cathode 115, a conductor 104, the right-hand terminal of secondary winding 96, conductor 105, conductor 108 and the left-hand terminal of the secondary winding 94, it being noted that the conductor 105 also is connected to a shield grid 116 of the tube 87. The tube 87 is also provided with a control grid 117 having a circuit which includes a resistor 118, a tap connection 119 on the resistor 84, the portion of that resistor fixed by the position of the tap connection, the conductor 112, conductor 104 and cathode 115 of the tube 87. A combined plate and biasing circuit for the tube 88 can be traced from the right-hand end of the transformer secondary winding 94, through conductor 100, the winding of the relay 91, a conductor 120, an anode 121, a cathode 122, conductor 104, secondary winding 96, conductor 105 and conductor 108 of the left-hand terminal of the secondary winding 94. The conductor 105 also extends to the terminal of a shield grid 123 of tube 88. A control grid 124 of the tube 88 is connected through a resistor 125 to the third tap 126 disposed on resistor 84.

In operation, if an application of the brakes is initiated while the locomotive carrying the equipment shown in Fig. 2 is moving at a speed in excess of sixty-five miles per hour, the resultant increase in pressure of fluid in control pipe 4 effects closure of the switch element 29 of pneumatic switch 27, thus completing the supply circuit between the battery 26 and inverter device 30, so that alternating current is available for energizing the circuits controlled by electron discharge devices 86, 87 and 88. With the locomotive traveling in excess of sixty-five miles per hour, the frequency of current supplied by the alternating current generator 18 through the inductance 82 and capacitance 83 is such as to cause flow of current by way of the rectifier 36 through the resistor 84 at a rate resulting in the impression of a sufficient positive voltage on each of the control grids of the tubes to render each of the tubes conductive. In other words, direct current supplied from positive terminal 37 of the rectifier 36 through resistor 84 to the negative terminal 38 of the rectifier creates a voltage drop across that resistor of such magnitude as to drive positive the control grid of each of the tubes, including the control grid 124 of tube 88 connected to the lowest voltage divider tap 126 and thus having relatively the lowest positive potential with respect to the associated cathode.

With each of the electron discharge devices 86, 87 and 88 thus maintained conductive, the respective plate circuits therefor hereinbefore traced are completed to energize the three relays 89, 90 and 91, thereby effecting energization of the medium speed magnet 13 and high speed magnet 14 of relay valve device 3, while the low speed magnet 12 thereof remains deenergized. The high speed magnet 14 is energized by way of a circuit which includes the positive terminal of the battery 126, conductor 97, contact element 29, conductor 98, a conductor 127, the picked-up contact element 128 associated with relay 90, a conductor 129, the picked-up contact element 130 of relay 91, a conductor 131, the winding of the magnet 14 and a return conductor 132 leading to the negative terminal of the battery. The circuit for energizing the medium speed magnet 13 includes the elements of the circuit just traced to and including the conductor 129, which is connected through the winding of the magnet 13 to the negative terminal of the battery. The relay 89 is provided with a contact element 133 which is also picked up at this time, thereby maintaining open the circuit for the low speed magnet 12.

With the medium and high speed magnet thus energized, the relay valve device 3 is conditioned in the manner hereinbefore explained to effect supply of fluid under pressure to the brake cylinder 2 at the maximum ratio with respect to the pressure in control pipe 4.

When the speed of the vehicle drops below sixty-five miles per hour, the corresponding reduction in the current flowing through resistor 84 results in such decrease in the positive voltage applied to the control grid 124 of tube 88 as to enable the negatively biased shield grid 123 to regain control for rendering the tube nonconductive. The relay 91 is consequently deenergized and the contact element 130 thereof is dropped out, thus interrupting the circuit for the high speed magnet 14 of the relay valve device 3. The pressure of fluid supplied to the brake cylinder 2 is then correspondingly reduced by the operation of the relay valve device 3 in the usual manner, so that brake cylinder pressure is maintained at the approved ratio with respect to control pipe pressure for the medium speed zone of the locomotive.

When the speed of the locomotive is further decreased and drops below forty miles per hour, the resultant fading of the positive voltage impressed on the control grid 117 of electron discharge device 87 renders that tube nonconductive, whereupon the relay 90 controlled thereby is deenergized and the contact element 128 dropped out. The medium speed magnet 13 of the relay valve device 3 is then deenergized, along with the low speed magnet 12 and high speed magnet 14, so that the brake cylinder pressure is further reduced with respect to that maintained in control pipe 4 to a ratio corresponding with the speed.

Upon reduction of the speed of the locomotive below twenty miles per hour, the positive voltage impressed on the control grid 109 of tube 86 fades sufficiently to cause the tube to become nonconductive, so that the relay 89 is deenergized and the contact element 133 thereof dropped to its circuit closing position. The low speed magnet 12 of the relay valve device 3 is then energized by way of a circuit which includes the conductor 127 leading from the positive terminal of the battery 26, the closed contact element 133, a conductor 134, the winding of the magnet 12, and conductor 132 leading to the negative terminal of the battery. The relay valve device 3 is then conditioned to maintain brake cylinder pressure at the low speed ratio, as hereinbefore explained.

*Apparatus shown in Fig. 3*

An electropneumatic brake equipment provided with electronic speed governor apparatus constructed in accordance with a different form of the invention is illustrated in Fig. 3 of the drawings, wherein the brake controlling elements common to all embodiments of the invention are again identified by the same reference characters. The equipment includes the alternating current generator 18 driven by the wheel unit 1, the rectifier 36, and a resistor 135 connected to the positive and negative terminals 37 and 38 of the rectifier, the generator being thus operative to supply direct current through the resistor to cause a voltage drop thereacross which is at all times a measure of the speed at which the locomotive is operated. A capacitance 136 is preferably connected in parallel with the resistor 136 for rendering the pulsating current supplied therethrough relatively constant. The three electron discharge devices or tubes 86, 87 and 88 employed in the embodiment shown in Fig. 2 and already described may again be utilized in the equipment shown in Fig. 3 for directly controlling energization of the speed magnet portions of the relay valve device 3, it being noted that in the present species of the invention all relays are dispensed with to provide a control system of relatively inexpensive construction. The three tubes are energized through the medium of the transformer 92 which is supplied with alternating current from the inverter 30 connected in the usual manner to the battery 26. The tubes 86, 87 and 88 have control grids suitably connected to three taps on the resistor 135 in such a manner as to render the tubes conductive at the preselected speeds, twenty, forty, and sixty-five miles per hour, respectively.

To explain the operation of the equipment shown in Fig. 3 it will again be assumed that an application of the brakes is effected while the vehicle is traveling at a speed in excess of sixty-five miles per hour. The output of the axle driven generator 18 which measures the vehicle speed as hereinbefore explained is then effective through the medium of the voltage divider 135 and associated tap connections 112, 119 and 126 to impress a positive charge on all of the control grids 109, 117 and 124 of sufficient magnitude to render the tubes conductive, upon closure of the switch element 29 by control pipe pressure. The relay valve device 3 is thus initially conditioned for operation to supply fluid under pressure to the brake cylinder 2 in response to the increase in pressure in the control pipe 4 in the predetermined ratio suitable for high speed operation, as a result of energization of the high speed magnet 14 and medium speed magnet 13 while the low speed magnet 12 remains in deenergized condition.

The high speed magnet 14 of the relay valve device 3 is energized by pulsating direct current supplied from the secondary winding 94 of the transformer 92 through a conductor 137 connected to the left-hand end of the secondary winding, the winding of the magnet 14, a conductor 138 having a current limiting resistor 139 interposed therein, the anode 121 of tube 88, cathode 122, a conductor 140, secondary winding 96, and a conductor 141 which is connected to the terminals of the respective shield grids of the tubes and to the right-hand end of the secondary winding 94. It will be noted that a condenser 142 is connected across the terminals of the high speed magnet 14 as a filter, to facilitate operation of the magnet on the pulsating current supplied by way of the tube. The resistor 139 is provided for limiting the charging current of this condenser to prevent damage to the tube. In similar fashion the circuit for energizing the medium speed magnet 13 can be traced from the left-hand end of secondary winding 94 through conductor 137, the winding of the magnet 13, a conductor 143 having a current limiting resistor 144 interposed therein, the anode 114 of tube 87, cathode 115, conductor 140, secondary winding 96, and conductor 141 to the right-hand end of the secondary winding 94. A condenser 194 is connected across the medium speed magnet 13 to smooth out the current passing therethrough as already explained.

The low speed magnet 12 is also directly connected to the secondary winding 94 of the transformer, but cannot be energized while the electron discharge device 86 is in a conductive condition since the tube controls a shunt circuit in parallel with the circuit for the magnet. This shunt circuit includes the left-hand terminal of the winding 94, conductor 137, a conductor 146 having a resistor 147 interposed therein, the anode 102 of tube 86, cathode 103, secondary winding 96, and conductor 141 leading to the right-hand end of the secondary winding 94. The conductor 146 has a junction point 148 to which is connected a conductor 149 leading to one terminal of the low speed magnet 12, the other terminal of which is connected through a conductor 150 and a half wave rectifier 151 to the conductor 140, but any current flowing through this circuit at this time is insufficient to effect operation of the valve within the relay valve device 3 controlled by the low speed magnet, since the gas-filled tube has a very low voltage drop which is too low to energize the magnet. It will be noted that a condenser 152 is connected across the low speed magnet 12.

It will be understood that the secondary winding 96 of the transformer is connected to the shield grids 107, 116 and 123 of the respective tubes 86, 87, and 88 in the manner hereinbefore explained in connection with the apparatus shown in Fig. 2, so that a negative biasing voltage is impressed on each of the shield grids during positive half cycles of alternating current when the anodes are rendered positive. This negative biasing voltage on the shield grids is insufficient to prevent the tubes from being rendered conductive at this time, due to the opposing positive voltages impressed on the control grids as a result of operation of the axle driven generator 18, so long as the vehicle is traveling at a speed exceeding sixty-five miles per hour. It will be observed that the plate circuit for each of the tubes is again combined with the shield grid circuit, and that the plate current must flow through the conductors used to provide the negative bias on the shield grid of each tube, thereby insuring that the negative bias cannot be lost without interruption of the associated plate circuit.

As a result of the initial application of the brakes effected through operation of the relay valve device 3, as just explained, the speed of the vehicle is quickly brought below sixty-five miles per hour. Due to the resultant reduction in the direct current supplied through the resistor 135 in proportion to vehicle speed, the positive voltage impressed upon the control grid 124 of tube 88, through the medium of the tap connection 126, current limiting resistor 125, the control grid, the cathode 122 of the tube and conductor 140 which is connected to the negative side of the resistor 135, is sufficiently decreased to render the negatively biased shield grid 123 effective to assume control, whereupon the tube 88 becomes nonconductive at the subsequent negative half cycle of alternating current. The high speed magnet 14 of the relay valve device 3 is thereby deenergized. With the medium speed magnet 13 alone energized, the relay valve device 3 is accordingly operated to reduce the pressure of fluid supplied to the brake cylinder 2 to the preselected ratio with respect to control pipe pressure suitable for the speed at which the locomotive is traveling.

Further reduction in the speed of the locomotive below forty miles per hour causes a proportionate decrease in the current flowing in the resistor 135 to such a degree as to reduce the positive voltage impressed on the control grid 117 of tube 87, with the result that the tube becomes nonconductive and interrupts the circuit for the medium speed magnet 13 of the control valve device 3. The control valve device 3 then again adjusts the ratio of brake cylinder pressure to control pipe pressure to correspond to the reduced speed of the locomotive.

At a vehicle speed of substantially twenty miles per hour, the output of the axle driven generator 18 is so reduced as to effect substantial withdrawal of the positive voltage on the control grid 109 of tube 86, and that tube is accordingly rendered nonconductive. The shunt circuit around the low speed magnet 12 of the relay valve device 3 provided by tube 86 when conductive is thus interrupted, and that magnet is promptly energized by way of the circuit which includes the left-hand terminal of secondary winding 94, conductor 137, conductor 146, resistor 147, conductor 149, the winding of the magnet 12, conductor 150, rectifier 151, conductor 140, secondary winding 96, and conductor 141 leading to the right-hand terminal of the secondary winding 94. With the low speed magnet 12 thus energized, the relay valve device 3 is rendered operative in the usual manner to supply fluid to the brake cylinder 2 at a pressure approximating 40% of the pressure of fluid in the control pipe 4. The rectifier 151 is provided to prevent undesired energization of the winding of low speed magnet 12 which would otherwise occur on alternate half cycles of alternating current supply while the tube 86 is momentarily non-conductive.

To summarize, it will be apparent from the foregoing description of three embodiments of my improved electronic brake control apparatus that any electropneumatic brake equipment embodying speed control features, including an electroresponsive relay valve device operative to adjust brake cylinder pressure in accordance with vehicle speed, can be more accurately and efficiently controlled upon substitution of my relatively inexpensive electronic apparatus for the multiple relay actuated apparatus heretofore employed. In an apparatus constructed in accordance with the invention the magnet valve elements of the usual relay valve device employed for selecting brake cylinder pressure in accordance with the speed are controlled by means of electron discharge devices, which may be "Thyratron" tubes of a standard industrial type. The associated axle driven speed governor may consist of an inexpensive alternating current generator and a simple output circuit connected to furnish the extremely small voltages required to control the grid bias of the several tubes involved. A transformer and an inverter of ordinary construction may be provided to render the apparatus operative from a battery, which is a common source of electrical energy on a railway vehicle. Thus substantially all elements of the invention are of a class commonly used in industry. It is to be expected that the cost of such devices will consequently be considerably less than that of the apparatus employing many relays formerly used.

Having now described my invention, what I claim as new and desire to secure by Letters Patent is:

1. In an electropneumatic speed controlled brake equipment for a wheeled vehicle including a brake cylinder, a pipe chargeable with fluid at different pressures to select a degree of application of the brakes, and an electro-responsive relay valve device variously conditionable for response to any given pressure in said pipe for relating brake cylinder pressure thereto in different preselected ratios corresponding to vehicle speed, in combination, a control circuit, means for energizing said control circuit in proportion to the vehicle speed, a source of electrical energy, a transformer connected thereto, electron discharge means connected to said transformer and operative to control the conditioning of said relay valve device, and means for rendering said electron discharge means responsive to the degree of energization of said control circuit.

2. In a vehicle brake control apparatus, the combination of brake controlling means, a plurality of electroresponsive means selectively operative to cause said brake controlling means to vary the degree of application of the brakes, a source of electromotive force, a plurality of electron discharge devices for controlling energization of said electroresponsive means from said source, a control circuit adapted to be energized in proportion to the speed of the vehicle, grid control means for biasing said electron discharge devices to a nonconductive condition, and other grid control means connected to said control circuit for rendering said electron discharge devices individually conductive in response to preselected degrees of energization of said control circuit.

3. In a vehicle speed controlled electropneumatic brake equipment of the class including a brake cylinder, a control pipe adapted to be supplied with fluid under pressure which can be varied for selecting the degree of application of the brakes, and a relay valve device having a plurality of electroresponsive devices and variously conditionable thereby for modulating the ratio of brake cylinder pressure to any given control pipe pressure, in combination, a source of direct current, relay means operable to control selective energization of said electroresponsive devices from said source, a source of alternating current, a plurality of electron discharge devices for controlling energization of said relay means from said source of alternating current, each of said discharge devices having a control grid, individual grid circuits associated with said electron discharge devices and arranged to impress different preselected biasing voltages on said grids, respectively, a control circuit adapted to be energized in proportion to the speed of the vehicle, and means for subjecting said grids to control potentials opposing said biasing potentials, whereby each of said electron discharge devices is rendered conductive in accordance with a predetermined speed of the vehicle.

4. In a vehicle speed controlled electropneumatic brake equipment of the class including a brake cylinder, a control pipe adapted to be supplied with fluid under pressure which can be varied for selecting the degree of application of the brakes, and a relay valve device having a plurality of electro-responsive devices and variously conditionable thereby for modulating the ratio of brake cylinder pressure to any given control pipe pressure, in combination, a source of electromotive force, means for controlling selective energization of said electroresponsive devices from said source including a plurality of electron discharge devices each having an anode-cathode circuit and a control grid, individual grid circuits for said discharge devices arranged to impress preselected negative biasing voltages on said grids tending to render each of said electron discharge devices nonconductive during an application of the brakes, a control circuit adapted to be energized in proportion to the speed of the vehicle, and means connected to said control circuit for impressing a positive voltage on each of said control grids varying in magnitude with the energization of said control circuit.

5. In a vehicle speed controlled electropneumatic brake equipment of the class including a brake cylinder, a control pipe adapted to be supplied with fluid under pressure which can be varied for selecting the degree of application of the brakes, and a relay valve device having a plurality of electroresponsive devices and variously conditionable thereby for modulating the ratio of brake cylinder pressure to any given control pipe pressure, in combination, a source of direct current, a plurality of electroresponsive relays for controlling circuits connecting said electroresponsive devices of the relay valve device to said source, a source of alternating current including a transformer having a plurality of secondary windings, a plurality of electron discharge devices arranged for controlling energization of said relay devices, respectively, each of said discharge devices comprising an anode-cathode circuit connecting one of said relays with a secondary winding of said transformer, a shield grid and a control grid, means for impressing a voltage on said shield grid tending to render said discharge device nonconductive, a control circuit adapted to be energized in proportion to the speed of the vehicle, and a plurality of control grid circuits associated with said control grids of the electron discharge devices, respectively, said control grid circuits being so connected to said control circuit as to impress upon said control grids positive biasing potentials of predetermined magnitude measuring speed of the vehicle, whereby each of said electron discharge devices is adapted to be rendered nonconductive at a different vehicle speed.

6. In a vehicle speed controlled electropneumatic brake equipment of the class including a brake cylinder, a control pipe adapted to be supplied with fluid under pressure which can be varied for selecting the degree of application of the brakes, and a relay valve device having a plurality of electroresponsive devices and variously conditionable thereby for modulating the ratio of brake cylinder pressure to any given control pipe pressure, in combination, a source of electromotive force, a plurality of relay circuits for connecting said source to said electroresponsive devices of the relay valve device, a plurality of electromagnetic relays selectively operative to control said relay circuits, a source of alternating current including a transformer, a plurality of electron discharge devices for controlling selective energization of said relays and individually comprising an anode-cathode circuit connecting the corresponding relay to said transformer, a shield grid and a control grid, a shield grid circuit common to said shield grids for impressing thereon a uniform biasing voltage tending to render said electron discharge devices nonconductive, a control circuit adapted to be energized in proportion to the speed of the vehicle, voltage divider means interposed in said control circuit, and control grid circuits individually arranged to impress a controlling positive voltage on the control grid of each corresponding electron discharge device, said control grid circuits being connected to said voltage divider means at preselected points for determining the conductive conditions of said discharge devices with relation to vehicle speed.

7. In a vehicle speed controlled electro-pneumatic brake equipment of the class including a brake cylinder, a control pipe adapted to be supplied with fluid under pressure which can be varied for selecting the degree of application of the brakes, and a relay valve device having a plurality of electroresponsive devices and variously conditionable thereby for modulating the ratio of brake cylinder pressure to any given control pipe pressure, in combination, a source of electromotive force, means controlling selective energization of said electroresponsive devices of said relay valve device from said source including a plurality of electron discharge devices, each of said discharge devices including an anode-cathode circuit, a shield grid and a control grid, means for impressing a potential on all of said shield grids tending to render the respective electron-discharge devices nonconductive, a series resonant circuit, means operative by the vehicle for energizing said series resonant circuit at a frequency proportional to vehicle speed, and means energized by current in said series resonant circuit and arranged to impress voltages of different magnitudes on the respective control grids of said electron discharge devices tending to render same conductive under different preselected speed conditions of the vehicle.

8. In a vehicle speed controlled electropneumatic brake equipment of the class including a brake cylinder, a control pipe adapted to be supplied with fluid under pressure which can be varied for selecting the degree of application of the brakes, and a relay valve device having a plurality of electroresponsive devices and variously conditionable thereby for modulating the ratio of brake cylinder pressure to any given control pipe pressure, in combination, a source of alternating current, a transformer having a primary winding connected to said source and a secondary winding, a plurality of circuits for energizing the respective electroresponsive devices of said relay valve device from said secondary winding, a plurality of electron discharge devices each having an anode-cathode circuit interposed in one of said circuits, a shield grid and a control grid, a shield grid circuit connected to all said shield grids for impressing thereon a biasing voltage tending to render said electron discharge devices nonconductive, a control circuit adapted to be energized in proportion to the speed of the vehicle, and control grid circuits individually energized from said control circuit for impressing positive potentials on said control grids to render said electron discharge devices conductive throughout certain predetermined different ranges of vehicle speed respectively.

9. In an electropneumatic speed controlled brake equipment for a wheeled vehicle including a brake cylinder, a pipe chargeable with fluid at different pressures to select a degree of application of the brakes, and an electroresponsive relay valve device variously conditionable for response to any given pressure in said pipe for relating brake cylinder pressure thereto in different preselected ratios corresponding to vehicle speed, the combination of generator means for supplying a voltage varying in correspondence with the vehicle speed, a circuit on which the voltage of said generator means is impressed for causing a current to flow therein that is a measure of vehicle speed, electron discharge means connected in a second circuit for controlling said electroresponsive relay valve device in accordance with the degree of current in said first-named circuit, and fluid pressure operated switch means responsive to the pressure of fluid in said pipe for also controlling said second circuit.

10. In a speed controlled vehicle brake equipment of the type having a plurality of electroresponsive means effective upon selective energization or deenergization in different combinations to cause application of the brakes associated with the vehicle wheels to correspondingly different degrees, the combination of means providing an electrical characteristic variable according to the vehicle speed, a source of voltage, a plurality of electron discharge devices, each having the same voltage from said source impressed thereon, for controlling said plurality of electroresponsive means, and means controlling said electron discharge devices selectively to cause firing thereof in response to different degrees of said electrical characteristic, thereby to effect a corresponding selective control of the electroresponsive means.

11. In a speed controlled vehicle brake equipment of the type having a plurality of electroresponsive means effective upon selective energization or deenergization in different combinations to effect correspondingly different degrees of application of the brakes associated with the wheels of the vehicle, the combination of means for supplying an electrical characteristic variable in correspondence with the speed of the vehicle, a plurality of electron discharge devices each of which has an anode, a cathode, and a control element, a source of voltage, means for impressing the same degree of voltage from said source across the anode-cathode path of each of said electron discharge devices, means rendering each of the control elements of each of said electron discharge devices subject to the electrical characteristic in a manner to cause firing of said electron discharge devices selectively and progressively at different degrees of said electrical characteristic corresponding to different vehicle speeds, and means associating said electron discharge devices with said plurality of electroresponsive means to cause said discharge devices to selectively control energization and deenergization of the electroresponsive means upon variations in the speed of the vehicle.

12. In a speed controlled vehicle brake equipment of the type having a plurality of electroresponsive means effective upon selective energization or deenergization in different combinations to cause correspondingly different degrees of application of the brakes associated with the wheels of the vehicle, the combination of means for supplying an electrical characteristic variable in correspondence with the speed of the vehicle, a plurality of electron discharge devices each having an anode, a cathode, a shield grid, and a control grid, a source of alternating-current voltage, means for impressing the same voltage from said source across the anode-cathode path of each of said electron discharge devices and at the same time subjecting the shield grid of each discharge device to voltage from said source in a manner effective to render the corresponding discharge device normally non-conductive, means for subjecting the control grid of each of said electron discharge devices to said electrical characteristic in such a manner as to cause said electron discharge devices to fire selectively and progressively at different degrees of said electrical characteristic, and means associating said electron discharge devices with said electroresponsive means to cause said discharge devices to selectively control energization and deenergization of the electroresponsive means so as to effect variation of the degree of application of the brakes upon variations in the speed of the vehicle.

13. In a speed controlled vehicle brake equipment of the type having a plurality of electroresponsive means effective upon selective energization or deenergization in different combinations to cause different degrees of application of the brakes associated with the wheels of the vehicle, the combination of means supplying an electrical characteristic variable in correspondence with the speed of the vehicle, a plurality of electron discharge devices, each having an anode, a cathode, and a control element, a source of voltage, means associating one of said electron discharge devices and one of said electroresponsive means in such a manner as to cause energization of said one electroresponsive means from said source only so long as said one of the discharge devices is firing, means associating a second one of said electron discharge devices and a second one of said electroresponsive means in such a manner as to cause energization of the said second one of the electroresponsive means from said source only so long as the said second one of the discharge devices is firing, and means associating the third one of said electron discharge devices and a third one of said electroresponsive means in such a manner as to cause deenergization of said third one of the electroresponsive means so long as said third one of the discharge devices is firing and energization of the said third one of the electroresponsive means from said source when said third one of the discharge devices is not firing, and means rendering the control element of each of said electron discharge devices subject to said electrical characteristic in a manner to cause firing thereof selectively and progressively over different speed ranges thereby to cause said discharge devices to control the said plurality of electroresponsive means in a manner to progressively decrease the degree of application of the brakes in response to a decreasing vehicle speed.

14. In a speed controlled vehicle brake equipment of the type having a plurality of electroresponsive means effective upon selective energization or deenergization in different combinations to cause different degrees of applications of the brakes associated with the wheels of the vehicle, the combination of means supplying an electrical characteristic variable in correspondence with the speed of the vehicle, a plurality of electron discharge devices, a source of voltage, means connecting one of said electron discharge devices in series relation with one of said electroresponsive means to said voltage source whereby to effect energization of the said one electroresponsive means so long as the said one discharge device is firing, means connecting a second one of said electron discharge devices in series relation with a second one of said electroresponsive means to said voltage source whereby to cause energization of the second electroresponsive means so long as said second electron discharge device is firing, means connecting the third one of said electron discharge devices in parallel relation to a third one of said electroresponsive means in a circuit on which the voltage of said source is impressed whereby said third electroresponsive means is deenergized so long as the said third one of the electron discharge devices is firing and energized when said third one of the electron discharge devices ceases to fire, and means subjecting the control element of each of said discharge devices to said electrical characteristic in such a manner as to cause firing of the corresponding discharge devices progressively and selectively at different degrees of said electrical characteristic, thereby to cause the said discharge devices to selectively control the plurality of electroresponsive means in such a manner as to effect progressive reduction of the degree of application of the brakes in response to reducing vehicle speed.

15. In a speed controlled vehicle brake equipment of the type having a plurality of electroresponsive means effective upon selective energization or deenergization in different combinations to cause different degrees of application of the brakes associated with the wheels of the vehicle, the combination of means for supplying an electrical characteristic varying in correspondence with the speed of the vehicle, a source of direct-current voltage, an inverter device connected to said source of direct current voltage for producing alternating-current voltage, a plurality of electron discharge devices, each of which has an anode, a cathode, and a control element, means for impressing alternating-current voltage delivered from said inverter across the anode-cathode path of each of said discharge devices, means for subjecting the control element of each of said discharge devices to said electrical characteristic in such a manner as to cause firing of the corresponding discharge device so long as said electrical characteristic exceeds a certain different degree for each of said discharge devices, and a plurality of electrical relays selectively controlled by said electron discharge devices in a manner to be energized by voltage supplied from said inverter, said relays functioning to control said plurality of electroresponsive means in a manner to cause progressive reduction in the degree of application of the brakes with reducing vehicle speed.

16. In a speed controlled vehicle brake equipment of the type having a plurality of electroresponsive means effective upon selective energization or deenergization in different combinations to effect different degrees of application of the brakes associated with the wheels of the vehicle, the combination of generator means operative to supply an alternating voltage varying in effective value and frequency substantially in correspondence with the speed of the vehicle, a circuit connected to said generator including a capacitor element effective to cause a reduction in the impedance of said circuit with an increasing frequency of the alternating-voltage delivered by the generator, a rectifier subject to the voltage in said circuit for supplying a direct-current voltage in correspondence therewith, and means controlled in accordance with the degree of the direct-current voltage supplied by said rectifier for causing selective energization or deenergization of the electroresponsive means in different combinations to correspondingly control the degree of application of the brakes according to the speed of the vehicle.

17. In a speed controlled vehicle brake equipment of the type having a plurality of electroresponsive means effective upon selective energization or deenergization in different combinations to effect different degrees of application of the brakes associated with the wheels of the vehicle, the combination of generator means operative to supply an alternating voltage varying in effective value and frequency substantially in correspondence with the speed of the vehicle, a series-resonant circuit connected to said generator means and including an inductance element and a capacitance element functioning cooperatively to effect a reduction in the impedance of said circuit with increasing frequency of the voltage delivered by the generator over the operating range thereof, a rectifier connected in said circuit for supplying a direct-current voltage corresponding to the alternating voltage in said circuit, and means controlled according to the degree of direct-current voltage delivered by said rectifier for selectively controlling said electroresponsive means in a manner to cause a progressive reduction in the degree of application of the brakes with reducing vehicle speed.

CLAUDE M. HINES.